(12) United States Patent
Thoman et al.

(10) Patent No.: US 10,682,780 B2
(45) Date of Patent: Jun. 16, 2020

(54) FACER FOR END FUSION OF POLYOLEFIN PIPES

(71) Applicant: McElroy Manufacturing, Inc., Tulsa, OK (US)

(72) Inventors: Timothy M. Thoman, Tulsa, OK (US); Arthur H. McElroy, II, Tulsa, OK (US); Jason A. Lawrence, Owasso, OK (US); Paul John Donaldson, Broken Arrow, OK (US); Brian M. O'Connell, Sand Springs, OK (US); Seth P. Ahrens, Tulsa, OK (US)

(73) Assignee: MCELROY MANUFACTURING, INC., Tulsa, OK (US)

( * ) Notice: Subject to any disclaimer, the term of this patent is extended or adjusted under 35 U.S.C. 154(b) by 221 days.

(21) Appl. No.: 15/709,468

(22) Filed: Sep. 19, 2017

(65) Prior Publication Data
US 2019/0084170 A1    Mar. 21, 2019

(51) Int. Cl.
*B26D 1/28* (2006.01)
*B26D 3/16* (2006.01)
(Continued)

(52) U.S. Cl.
CPC ............... *B26D 1/28* (2013.01); *B23B 5/08* (2013.01); *B23B 5/16* (2013.01); *B26D 3/166* (2013.01); *B26D 7/0006* (2013.01); *B26D 7/01* (2013.01); *B26D 7/0616* (2013.01); *B26D 7/2614* (2013.01); *B29C 65/02* (2013.01); *B29C 66/02241* (2013.01); *B29C 66/1142* (2013.01);
(Continued)

(58) Field of Classification Search
CPC .... B23B 5/08; B23B 5/16; B26D 1/28; B26D 3/166; B26D 7/0006; B26D 7/01; B26D 7/0616; B26D 7/0683; B26D 7/2614; B26D 2007/013; B29C 65/20; B29C 65/2092; B29C 66/02241; B29C 66/1142; B29C 66/5221; B29C 66/73921; B29C 66/8414; B29C 2793/0081; B29D 23/003
See application file for complete search history.

(56) References Cited

U.S. PATENT DOCUMENTS

| | | | | |
|---|---|---|---|---|
| 3,552,265 A | * | 1/1971 | Lucas | B29C 65/7802 409/145 |
| 3,729,360 A | * | 4/1973 | McElroy | B25B 5/147 156/499 |

(Continued)

*Primary Examiner* — Michael A Tolin
(74) *Attorney, Agent, or Firm* — Frank J. Catalano; Gable Gotwals (57) ABSTRACT

A facer facing the ends of polyolefin pipes for butt fusion is modular in the sense that it employs three types of modules, a drive unit, two blade holders and a motor assembly, that are separable from one another and each independently light enough to be hand-lifted along walls and up to ceilings. The drive unit module is adjustable to accommodate different guide rail spacings. The blade holder modules are interchangeable to accommodate different diameters of pipe. The motor assembly module has multispeed capability to accommodate the total area of material to be faced. Each module can be exchanged or modified without use of tools to change the geometry of the assembled facer to accommodate different fusion machines and/or diameters of pipe within working spaces dictated by the diameter of the pipe and not by a fixed geometry of a facer.

9 Claims, 10 Drawing Sheets

(51) Int. Cl.
    *B23B 5/08*     (2006.01)
    *B23B 5/16*     (2006.01)
    *B26D 7/26*     (2006.01)
    *B29C 65/20*     (2006.01)
    *B26D 7/00*     (2006.01)
    *B26D 7/06*     (2006.01)
    *B26D 7/01*     (2006.01)
    *B29C 65/00*     (2006.01)
    *B29C 65/02*     (2006.01)

(52) U.S. Cl.
    CPC .... *B29C 66/5221* (2013.01); *B29C 66/73921* (2013.01); *B29C 66/8414* (2013.01); *B26D 2007/013* (2013.01); *B29C 65/2092* (2013.01); *B29C 66/71* (2013.01)

(56) References Cited

U.S. PATENT DOCUMENTS 3,793,119 A * 2/1974 Province .................. B23B 5/08
                                                                                                    156/499
5,725,724 A     3/1998 Andrew et al.

* cited by examiner

FACER FOR END FUSION OF POLYOLEFIN PIPES

BACKGROUND OF THE INVENTION

This invention relates generally to machines used in the process of fusing polyolefin pipe and more particularly concerns facers used to prepare the opposed ends of two polyolefin pipes for butt fusion.

Situations in which a facer might be of use in extending a polyolefin pipe in a tight working space, such as adjacent a wall or ceiling, are not uncommon. And accessibility to such a tight working space may be further complicated by the presence of other pipes, equipment and supporting structure in the vicinity. Unfortunately, however, known facers for polyolefin pipes of mid-range diameter are poorly designed for such applications.

Most known mid-range diameter polyolefin pipe facers are simply too heavy to be lifted by hand into such tight working spaces. For example, facers for 24" OD polyolefin pipe typically weigh between 200 and 400 pounds.

Many facers are designed to face a range of pipe sizes and so their output speeds (RPM) are selected to handle the largest diameter or thickest wall pipe in their pipe range. Consequently, when they are used to face a pipe with a smaller diameter or thinner wall, they operate slower than necessary and do not make full use of their available horsepower.

Most known facers are designed to be mounted on carriages of only one size and their carriages are designed to be modified to permit the same facer to face a range of pipe sizes. Such facers must be sized for the largest pipe diameter in their range. Consequently, when used to face runs of smaller diameter pipe, the carriage size prevents the runs of pipe from being as close together as might otherwise be possible.

And most known facers produce polyolefin ribbons that can wrap tightly around the ends of the opposed pipes during facer rotation. The ribbons can block the operator's view of the pipe ends and can build up sufficiently to require periodic stoppage of the facing process to clear the ribbons. Furthermore, the ribbons can fall into, tangle in and be hard to clean out of the fusion machine.

It is, therefore, an object of this invention to provide a polyolefin pipe facer that is of use in extending a polyolefin pipe in a tight working space. Another object of this invention is to provide a polyolefin pipe facer that reduces the impact of a facer's weight on its utility for use in a tight working space. A further object of this invention is to provide a polyolefin pipe facer that reduces the impact of a facer's size on its utility for use in a tight working space. It is also an object of this invention to provide a polyolefin pipe facer that affords greater accessibility to tight working spaces than known facers. Yet another object of this invention is to provide a polyolefin pipe facer that makes full use of its available horsepower for more than one size of pipe. An additional object of this invention is to provide a polyolefin pipe facer that enables the running of multiple sizes of pipe closer together than is possible with known facers. And it is an object of this invention to provide a polyolefin pipe facer that controls the dispersion of polyolefin ribbons produced by the facer.

SUMMARY OF THE INVENTION

In accordance with the invention, a facer is provided that can be mounted on the guide rails of a fusion machine carriage and used to prepare polyolefin pipes for end fusion.

The facer has a drive unit with guide rail brackets and an output shaft. The brackets are adapted for tool-free engagement preventing horizontal and vertical displacement of the drive unit relative to the guide rails. Two blade holders are adapted for tool-free engagement on and rotation with the output shaft of the drive unit with the blade holders in parallel and on opposite sides of the drive unit. A motor assembly is adapted for tool-free engagement preventing horizontal and vertical displacement of the motor assembly in relation to the drive unit. A linkage engages the output shafts of the drive unit and the motor assembly for transmission of power from the motor assembly output shaft to a drive unit output shaft. The linkage may be a mechanical coupling and may include a gearbox.

The facer drive unit has a horizontal output shaft parallel to the guide rails. The free ends of the horizontal output shaft are on opposite sides of the drive unit and have penultimate portions of identical non-circular cross-section and ultimate portions with identical concentric circular adapters. Each blade holder has a center opening complementing the penultimate portion of a respective free end of the horizontal output shaft. Two latching assemblies, each surrounding its respective blade holder center opening, are operable to secure their respective blade holder to a respective one of the shaft concentric circular adapters with the center opening engaged on its respective shaft penultimate portion and with the two blade holders in parallel relationship. Preferably, each non-circular free end of the horizontal output shaft is hexagonal and each latching assembly is a split wedge clamp ring. The facer may have multiple pairs of blade holders of different diameters interchangeable with two blade holders. At least one blade is mounted on each blade holder at an angle selectable to cause ribbons of polyolefin shaved thereby to be dispensed either inside of or outside of their respective pipe.

The drive unit module of the facer has an elongated frame and two guide rail brackets, one on each end portion of the frame. Two arrays of co-operable registries, each array corresponding to a respective one of the guide rail brackets, are configured to locate the guide rail brackets in any of multiple symmetrically spaced relationships from a center of the frame. Two indexing assemblies, one on each end portion of the frame, configured to secure the guide rail brackets in any of multiple symmetrically spaced relationships, are used to space the guide rail brackets in the spaced relationship closest to the distance between the guide rails. The guide rail brackets are U-shaped. A horizontal U-shaped bracket is engageable on one of the guide rails by lateral motion of the frame. A vertical U-shaped bracket is engageable on the other guide rail by downward motion of the vertical U-shaped bracket with the horizontal U-shaped bracket engaged on the one of the guide rails. A clamp mounted on the horizontal U-shaped bracket constrains facer motion in a vertical plane. A clamp mounted on the vertical U-shaped bracket constrains facer motion in a horizontal plane. A latch assembly mounted on the vertical U-shaped bracket retains the facer on the guide rails. Each array of co-operable registries has multiple apertures spaced longitudinally on the elongated frame and an aperture on its respective one of the guide rail brackets. Each index assembly is a spring pin. The linkage has an input shaft, an output shaft and a gearbox between the input and output shafts. Two adapters, one on each end of the linkage output shaft, enable tool-free engagement on and rotation with the linkage output shaft of a respective blade holder with the blade holders in parallel. A mounting socket is adapted for engagement with the frame of the drive motor assembly.

Each blade holder module has a disk with a center opening for closely fitting a perimeter of a penultimate portion of the end of the drive unit module output shaft. A latching assembly surrounds the center opening and is operable to secure the disk to an ultimate portion of the end of the drive unit module output shaft with a disk perpendicular to the shaft. A blade is mounted on a distal face of the disk relative to the output shaft of the drive unit at either an angle causing ribbons of polyolefin shaved thereby to be dispensed inside of the pipe or an angle causing ribbons of polyolefin shaved thereby to be dispensed outside of the pipe. The disk has a recess in its distal face with two pairs of two holes in the recess registrable with two holes in the blade. Alignment of the two holes in the blade with one of the two pairs of holes in the disk causes the blade to be at the angle causing ribbons of polyolefin shaved thereby to be dispensed inside of the pipe. Alignment of the two holes in the blade with the of the two pairs of holes in the disk causes the blade to be at the angle causing ribbons of polyolefin shaved thereby to be dispensed outside of the pipe. The center opening is non-circular and preferably hexagonal. The latching assembly is preferably a split wedge clamp ring.

The motor assembly module has a motor, a gearbox driven by the motor, an output shaft from the gearbox and a coupler on a free end of the output shaft. A connector has plug-and-socket components, one fixed to the motor assembly module and the other fixed to the frame of the drive unit module. The components have a configuration adapted for tool-free engagement preventing horizontal and vertical displacement of the motor assembly module in relation to drive unit module with the gearbox output shaft coupler engaged with the input shaft coupler for rotation with the gearbox output shaft. In this configuration, the couplers are spaced from their respective components so as to align the couplers on a common center axis of the drive unit input shaft and the gearbox output shaft. One component of the connector is adapted to telescope in the other component to engage the couplers. Apertures in the telescoping components are alignable to cooperate with a detent pin to secure them with the couplers engaged. The telescoping components are preferably vertically aligned tubular members of square cross-section. The gearbox is preferably a multi-speed gearbox operable at a speed selected to correspond to a cross-section of a pipe being faced.

BRIEF DESCRIPTION OF THE DRAWINGS

Other objects and advantages of the invention will become apparent upon reading the following detailed description and upon reference to the drawings in which.

While the invention will be described in connection with preferred embodiments thereof, it will be understood that it is not intended to limit the invention to those embodiments or to the details of the construction or arrangement of parts illustrated in the accompanying drawings.

DETAILED DESCRIPTION

The Facer

Figure 1:
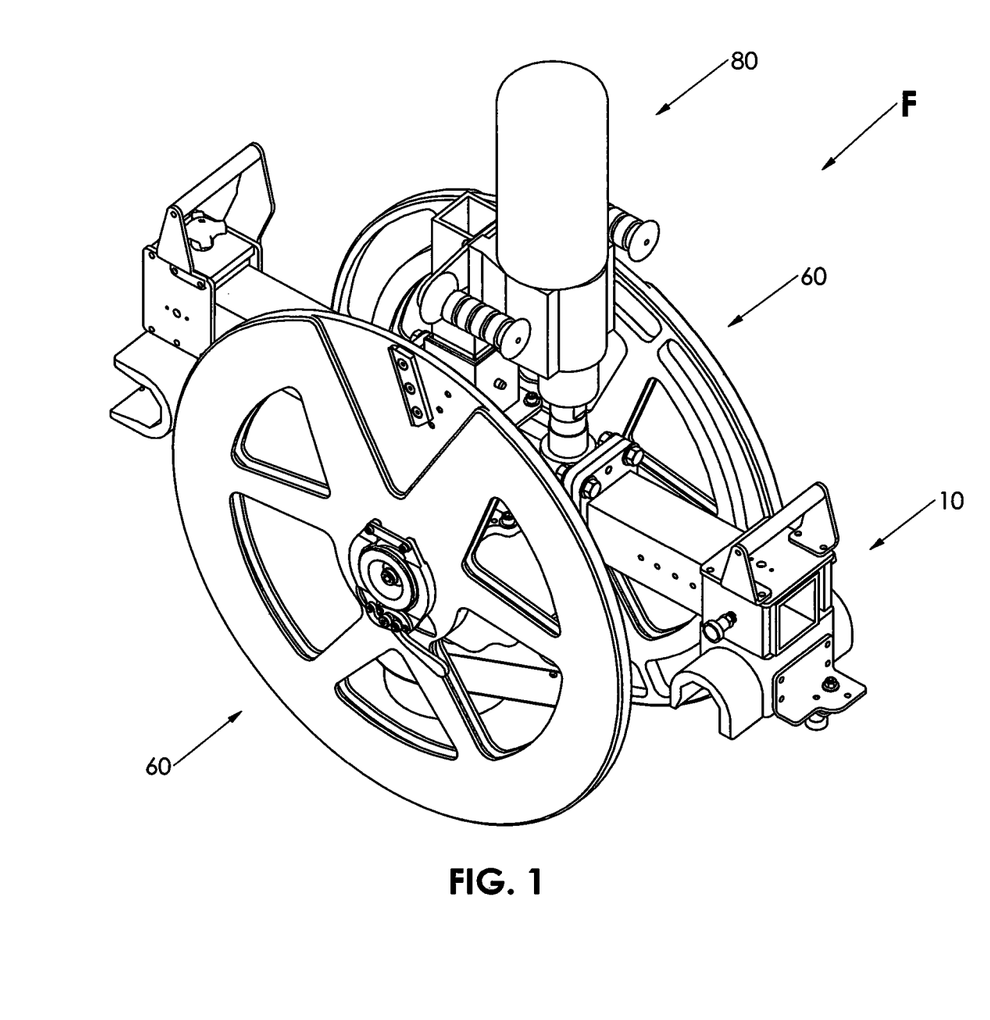
FIG. 1 is a perspective view of a preferred embodiment of a facer in accordance with the invention for use in a process for end fusion of polyolefin pipe.

Looking first at FIG. 1, a modular facer F is adapted to be engaged on the guide rails R (seen in FIGS. 6-8) of a fusion machine carriage (not shown) for the purpose of facing the ends of polyolefin pipes P (seen in FIGS. 9A-9B) for butt fusion. The term "polyolefin" identifies a most common application of the modular facer but is intended to include "nylon," PVC and other fusible non-polyolefin pipes.

The facer F is modular in the sense that it employs three types of modules including a drive unit 10, two blade holders 60 and a motor assembly 80 that are separable from one another. Each module 10, 60, 80 is independently light enough to be hand-lifted along walls and up to ceilings (not shown). However, the modules 10, 60 and 80 can each be exchanged or modified without use of tools in order to change the geometry of the facer F so that the same facer F can be used to face different diameters of pipe within working spaces dictated by the diameter of the pipe and not by the fixed geometry of a fusion machine and facer.

Figure 2A:
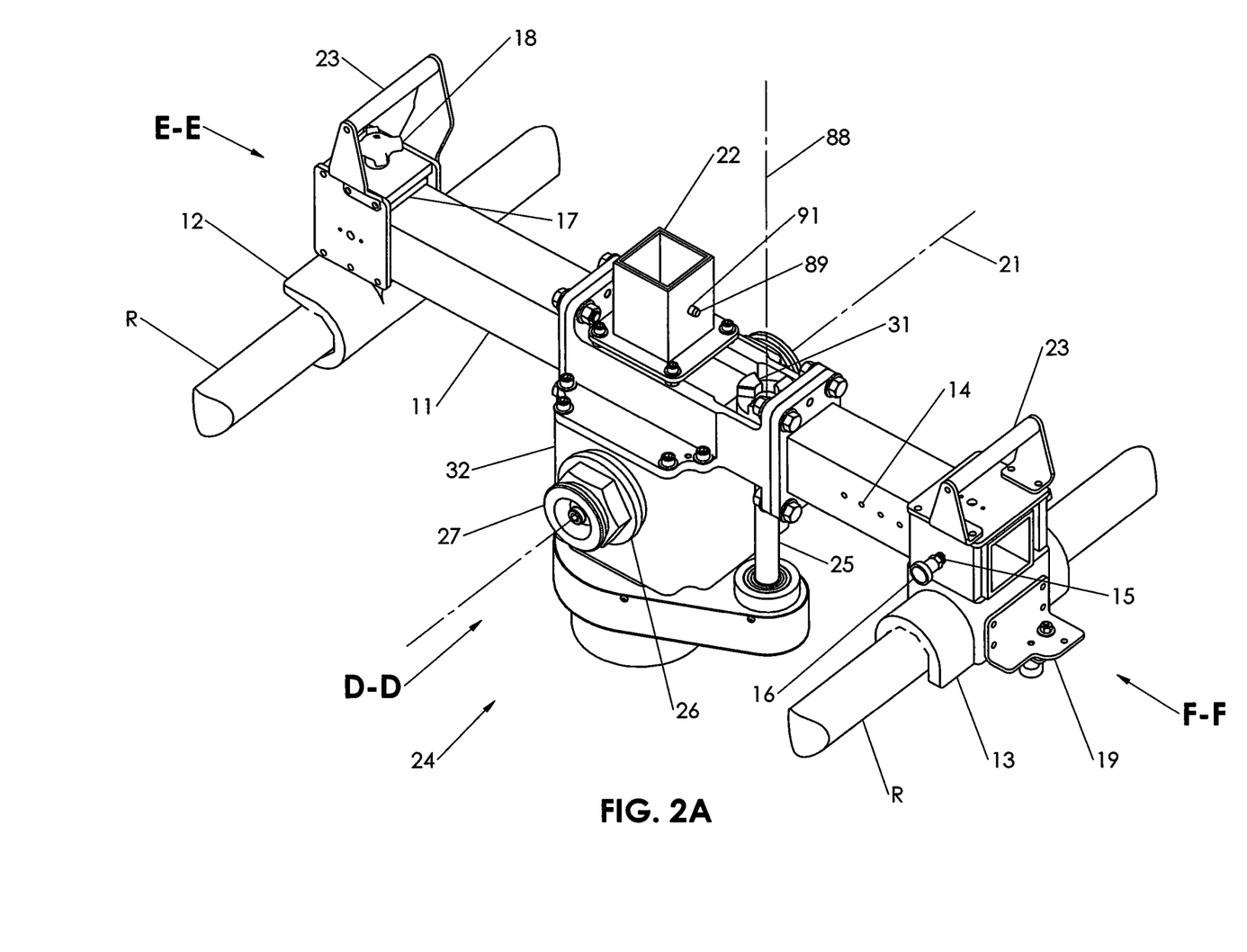
FIG. 2A is an enlarged perspective view of a preferred embodiment of the drive unit of the facer of FIG. 1.
Figure 2B:
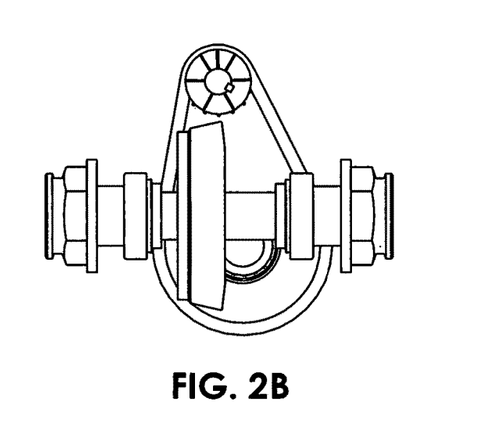
FIG. 2B is a top plan view illustrating a preferred embodiment of the gear assembly housed in the gearbox of the drive unit of FIG. 2A.
Figure 2C:
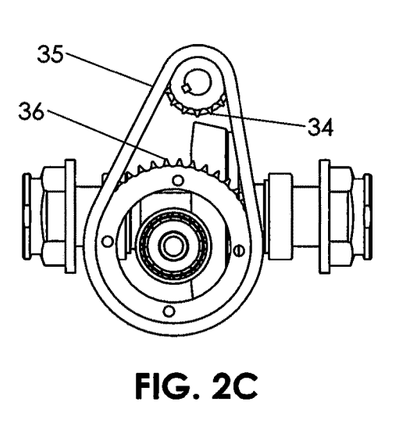
FIG. 2C is a bottom plan view of the gear assembly of FIG. 2B.
Figures 2D, 2E:
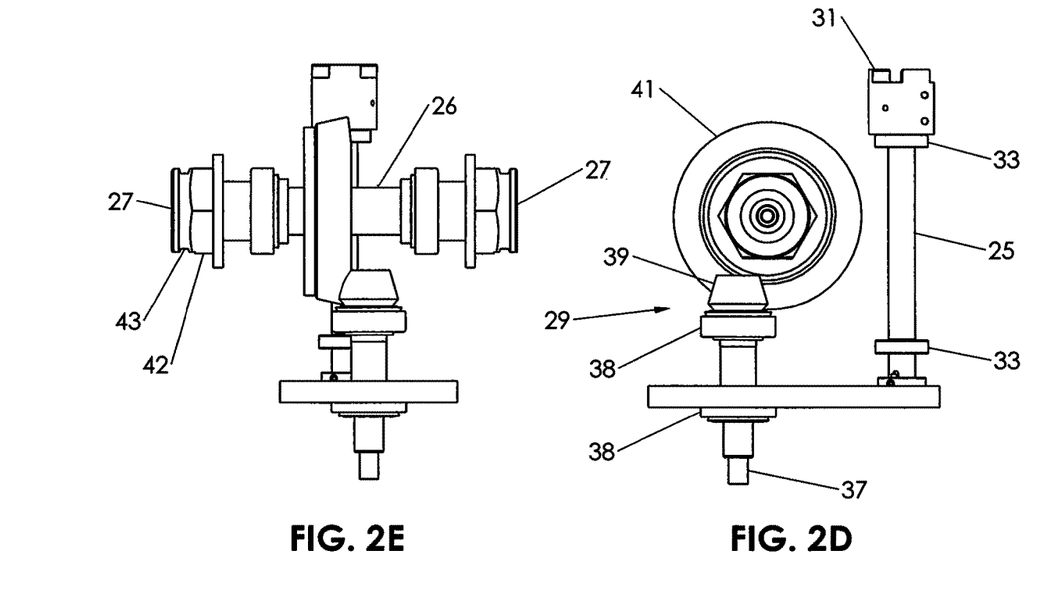
FIG. 2D is an elevation view of the gear assembly of FIG. 2B as seen in the direction D-D of FIG. 2A.
FIG. 2E is an elevation view of the gear assembly of FIG. 2B as seen in the direction E-E of FIG. 2A.
Figure 2F:
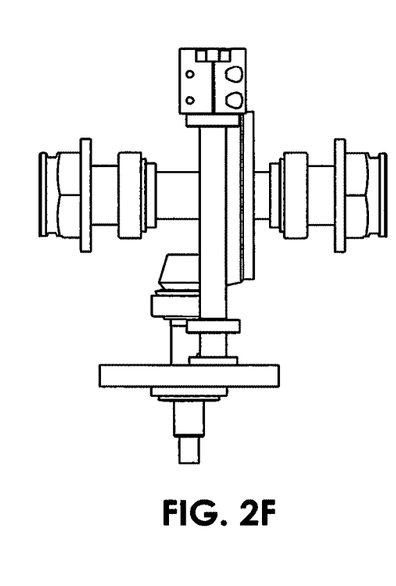
FIG. 2F is an elevation view of the gear assembly of FIG. 2B as seen in the direction F-F of FIG. 2A.
Figure 3A:
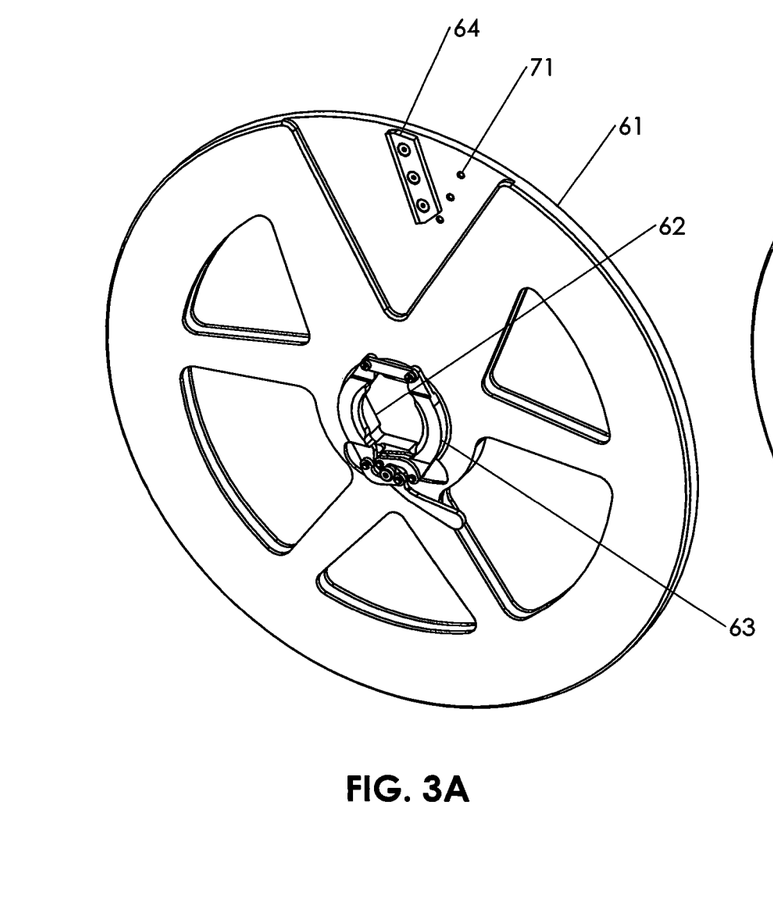
FIG. 3A is an enlarged perspective view illustrating one cutting face of a preferred embodiment of the two blade holders of the facer of FIG. 1 with its blades in a "ribbon-inside" configuration.
Figure 3B:
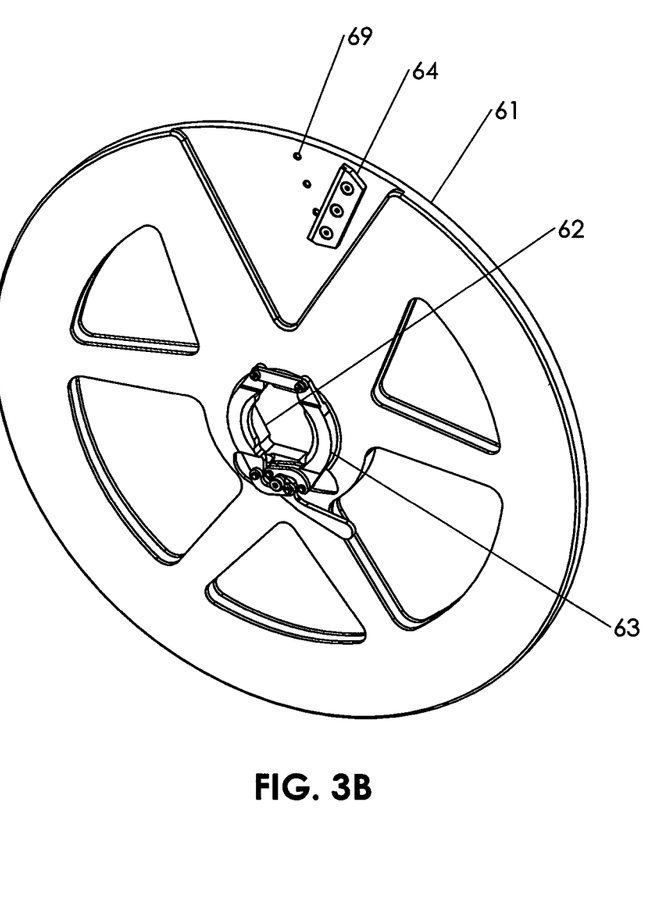
FIG. 3B is an enlarged perspective view illustrating the other cutting face of the preferred embodiment of the two blade holders of the facer of FIG. 1 with its blades in a "ribbon-outside" configuration.
Figure 3C:
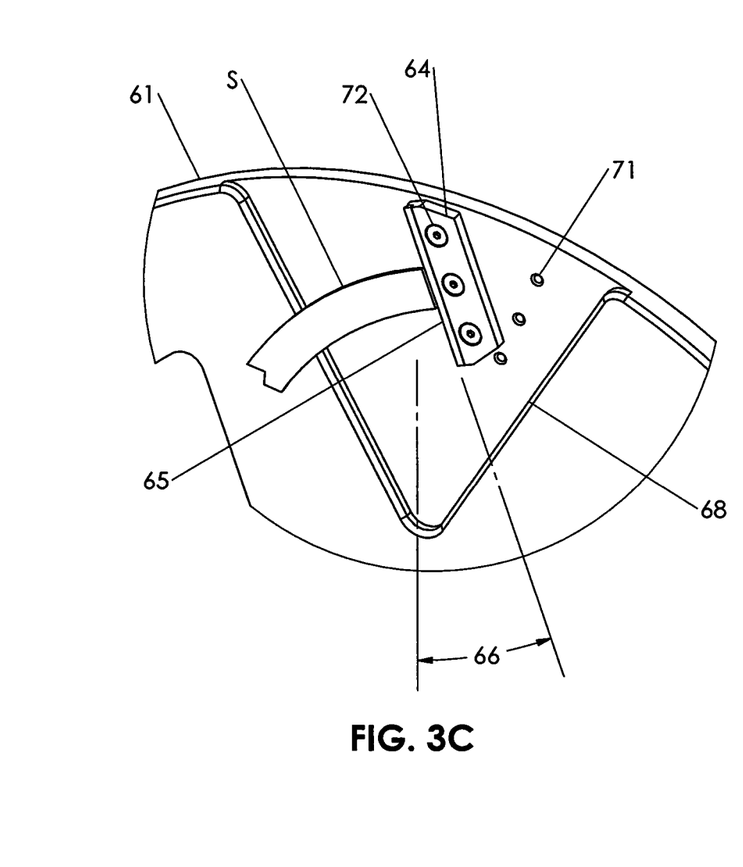
FIG. 3C is an enlarged perspective view illustrating one cutting face of a preferred embodiment of the two blade holders of the facer of FIG. 1 with its blades in a "ribbon-inside" configuration.
Figure 3D:
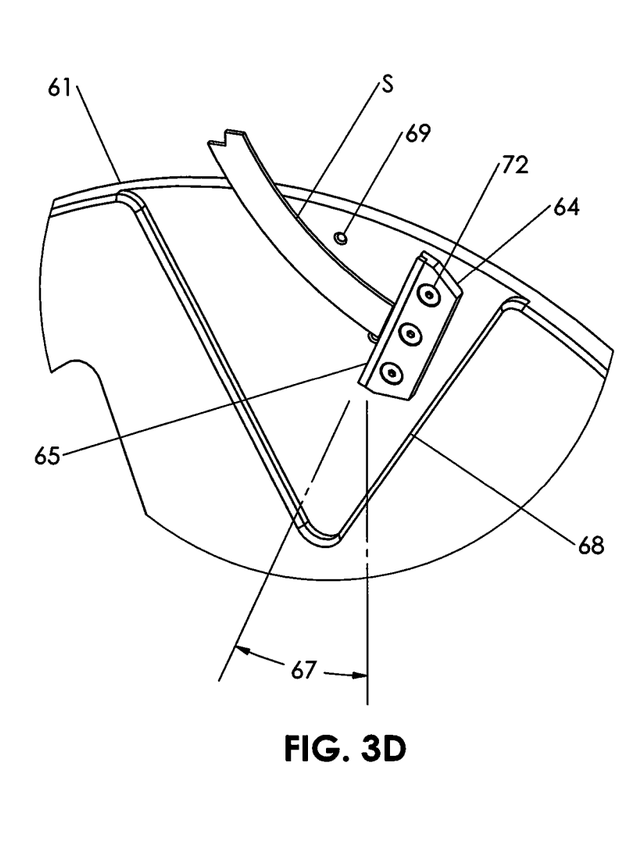
FIG. 3D is an enlarged perspective view illustrating the other cutting face of the preferred embodiment of the two blade holders of the facer of FIG. 1 with its blades in a "ribbon-outside" configuration.
Figure 3E:
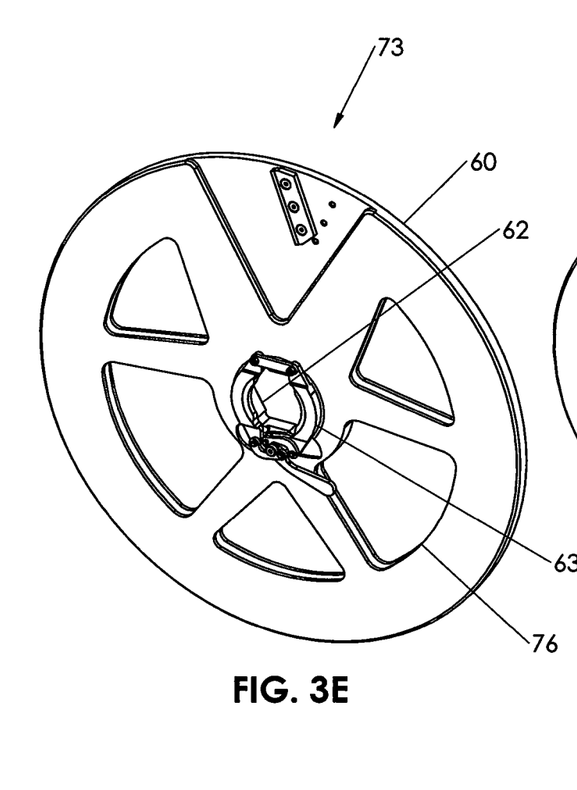
FIGS. 3E, 3F and 3G are perspective views illustrating large, medium and small blade holders, respectively, for use with the same drive unit according to FIG. 2A.
Figure 3F:
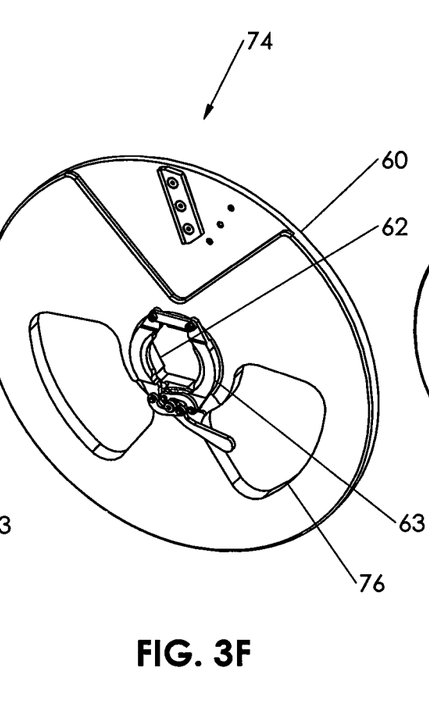
Figure 3G:
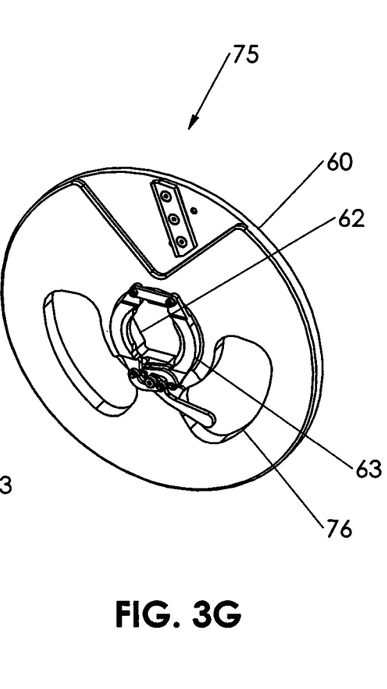
Figure 4:
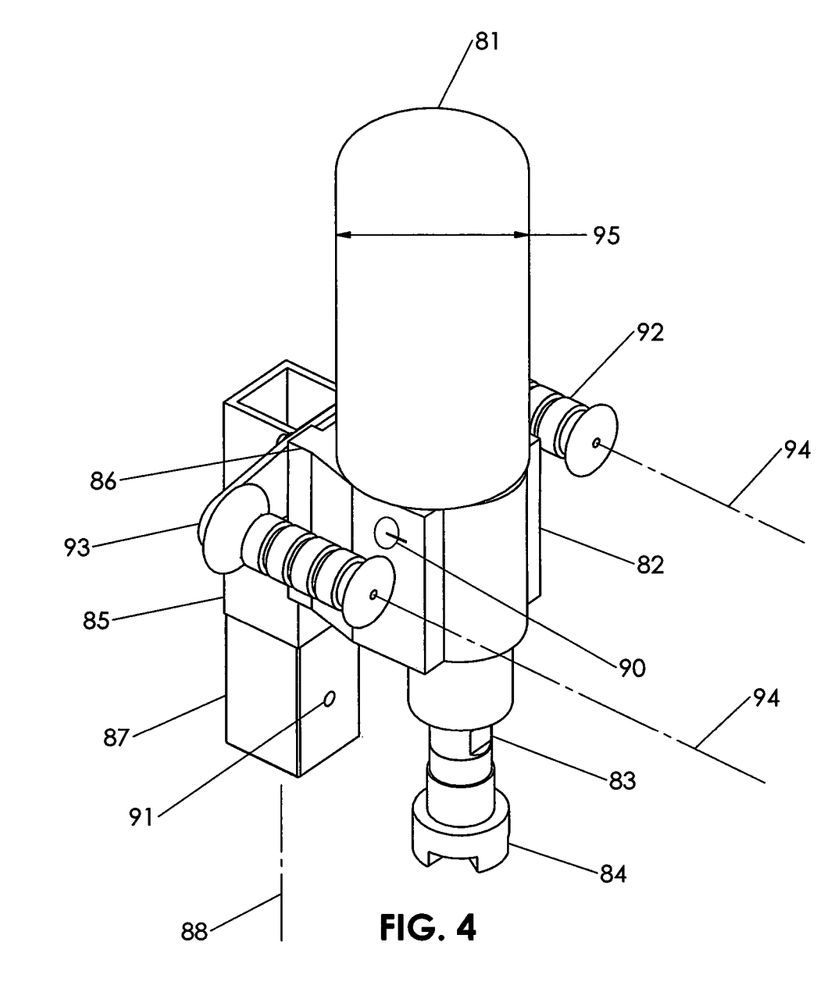
FIG. 4 is a perspective view of a preferred embodiment of the motor assembly of the facer of FIG. 1.

This is made possible by use of a drive unit 10, seen in FIGS. 1 and 2A-2F, that is adjustable to accommodate different spacing between guide rails R of different fusion machines, by use of blade holders 60, seen in FIGS. 1 and 3A-3G, that are interchangeable to accommodate different diameters of pipe P and by use of a motor assembly 80, seen in FIGS. 1 and 4, that has multispeed capability to accommodate the total area of material to be faced, a total which varies in relation to the diameter and thickness of the pipe.

The Drive Unit

Turning to FIG. 2A, a preferred embodiment of the drive unit 10 of the facer F is seen mounted on the guide rails R of a carriage of a machine used to fuse polyolefin pipe end-to-end. An elongated frame 11 has two guide rail brackets 12 and 13, one on each end portion of the frame 11. Two sets of registries 14 and 15, each corresponding to a respective guide rail bracket 12 or 13, are configured to locate their respective brackets 12 or 13 in any of multiple symmetrically spaced relationships from a center axis 21 of the elongated frame 11. Looking at FIG. 2A in the direction D-D, the left hand registries 14 and 15 are not seen but are a mirror image of the right hand registries 14 and 15. Two indexing assemblies 16, one on each end portion of the elongated frame 11, secure their respective brackets 12 or 13 in any selected one of multiple symmetrically spaced relationships at the spaced relationship that is closest to the distance between the guide rails R. Thus, a single drive unit frame 11 can, for example, fit six different sizes of fusion machine carriages if the locations of the guide rail brackets 12 and 13 have registries 14 that are adjustable to six different carriage guide rail spacings.

The elongated frame 11 as illustrated is fixed in overall length. The guide rail brackets 12 and 13 slide inward for smaller fusion machine carriages but the frame overall length of the frame 11 stays the same. However, the frame 11 may be retractable within the space between the guide rail brackets 12 and 13, for example by use of a telescoping frame or exchangeable frame arms.

As seen in FIG. 2A, both guide rail brackets 12 and 13 are U-shaped with one being horizontal 12 and the other vertical 13. The horizontal bracket 12 is engageable on its respective guide rail R by lateral motion of the elongated frame 11 and the vertical bracket 13 is engageable on its respective guide rail R by downward motion of its respective end of the elongated frame 11 with the horizontal bracket 12 engaged on its respective guide rail R.

Also as shown in FIG. 2A, each set of registries 14 and 15 includes multiple apertures 14 spaced longitudinally on the elongated frame 11 and an aperture 15 on its respective guide rail bracket 12 or 13. Each index assembly 16 is a spring pin that, when its respective bracket aperture 15 is aligned with a selected one of its respective multiple apertures 14 on the elongated frame 11, can be engaged in its respective aligned apertures 14 and 15 to secure the brackets 12 and 13 at symmetrical spacing from the center axis 21 of the elongated frame 11.

After the horizontal guide rail bracket 12 is registered and indexed on the frame 11, a clamp 17 mounted on the bracket 12 is tightened by use of a knob 18 to constrain facer motion in a vertical plane. After the vertical guide rail bracket 13 is registered and indexed on the frame 11, a clamp (not seen) mounted on the bracket 13 is tightened by use of a knob to constrain facer motion in a horizontal plane. The vertical bracket clamp is similar to the horizontal bracket clamp 17 but in a 90° rotated orientation.

Figure 9A:
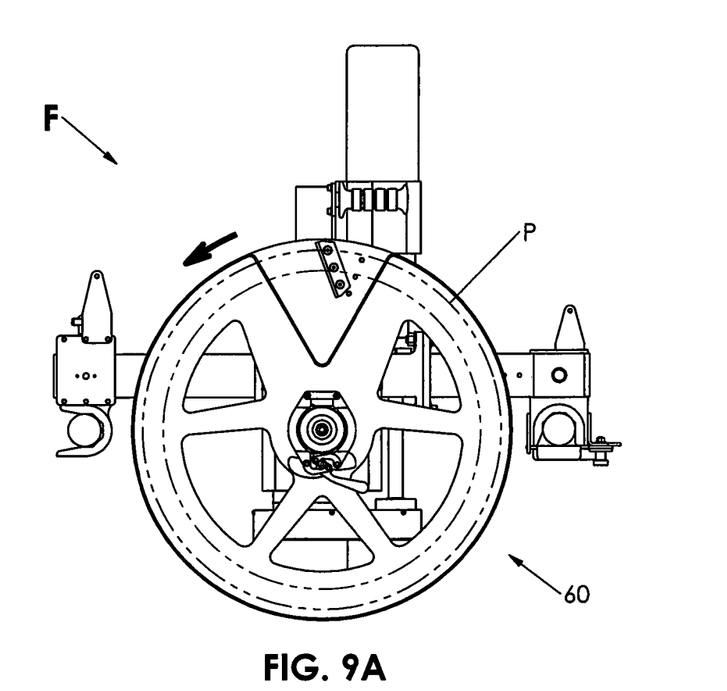
FIGS. 9A and 9B are side elevation views illustrating the assembled facer of FIG. 8 using the large and small blade holders of FIGS. 3E and 3G, respectively.
Figure 9B:
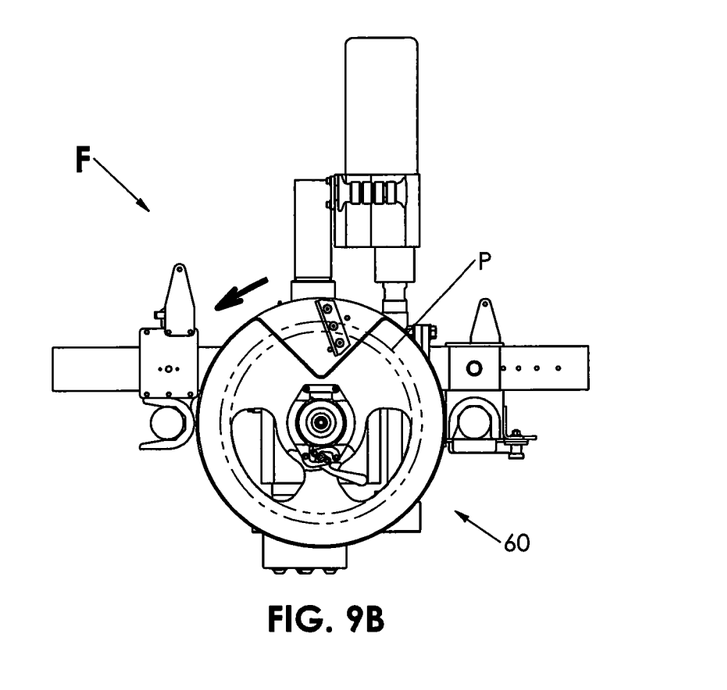

A latch assembly 19 mounted on the vertical guide rail bracket 13 retains the facer F on the guide rails R. As best seen in FIGS. 9A and 9B, the latch assembly 19 has a latch arm that pivots to cross under the guide rail R and engage a latch slot on the other side. A pull spring pin secures the arm in the latched or unlatched position. The horizontal guide rail bracket 12 cannot slide off its guide rail R as long as the vertical guide rail bracket 13 is on its guide rail R.

In the embodiment of FIG. 2A, a mounting socket 22 on the elongated frame 11, as shown fixed on the top of the frame 11 in alignment with the center axis 21, is adapted for engagement with the frame 85 of the motor assembly 80, hereinafter discussed. And each of the guide rail brackets 12 and 13 is equipped with a handle 23 to facilitate lifting and manipulating the drive unit 10 into position on the guide rails R.

Also, as shown in FIG. 2A, the drive unit 10 has a linkage 24 with an input shaft 25 and an output shaft 26. Two adapters 27 and 28, one on each end of the linkage output shaft 26, enable tool-free engagement and rotation of respective blade holders 60 on and with the linkage output shaft 26 with the blade holders 60 in parallel. Preferably, the linkage 24 includes a hypoid gear 29 that converts input shaft 25 rotation about a vertical axis to output shaft 26 rotation about a horizontal axis. This enables the motor assembly 80 to be centered and balanced, rather than cantilevered and imbalanced, on the input drive 10.

Looking at FIGS. 1 and 2A, a preferred embodiment of the drive unit linkage 24 extends from its input coupler 31 through a gearbox 32 to the adapters 27 on its output shaft 26. As seen in FIGS. 2B-2F, the linkage 24 is illustrated with the housing of the gearbox 32 removed. The linkage input shaft 25 rotates on ball bearings 33 in unison with the input coupler 31 on one of its ends and a drive sprocket 34 on its other end. The input coupler 31 is adapted to mate with an output shaft coupler 84 of the motor assembly 80 to transfer torque via the input shaft 25 to the drive sprocket 34. The drive sprocket 34 is engaged by a roller chain 35 to a driven sprocket 36 with its sprocket shaft 37 mounted on tapered roller bearings 38. In this embodiment, the "sprocket shaft" 37 is an extension of the pinion 39 and extends in parallel with the drive unit input shaft 25 to a pinion 39 engaged with a ring gear 41. The ring gear 41 and pinion 39 redirect the rotational motion of the input and drive sprocket shafts 25 and 37 about their vertical axes to the rotational motion of the output shaft 26 of the drive unit 10 about its horizontal axis.

Continuing to look at FIGS. 2B-2F, the output shaft 26 of the drive unit 10 extends at each end to respective adapters 27 and 28 configured for tool free connection to a respective blade holder 60. As shown, the blade holder adapters 27 have identical penultimate noncircular portions 42 and identical ultimate concentrically circular portions 43 cooperable for mating with components of its respective blade holder 60 hereinafter described. As shown, the penultimate noncircular portion 42 of the adapters 27 are hex shaped.

The Blade Holder

Figure 5:
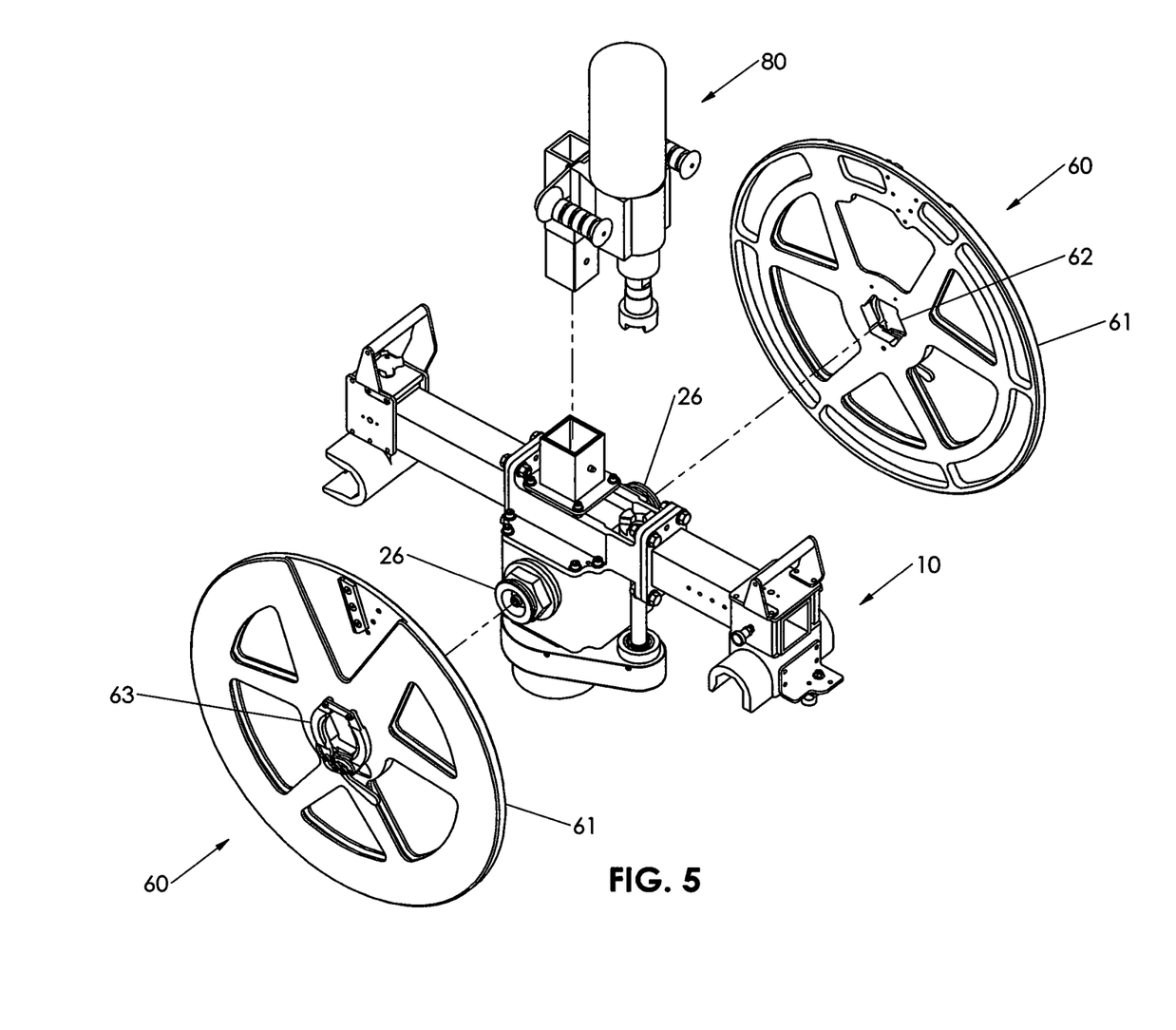
FIG. 5 is a perspective view of the three modules of the facer of FIG. 1 arranged for assembly into a facer according to FIG. 1.

Looking now at FIGS. 1 and 5, two blade holders 60 are mounted on the drive unit 10 with the blade holders 60 parallel to each other and on opposite sides of drive unit 10. As shown, each blade holder 60 is a disk 61 with a center opening 62 for closely fitting a perimeter of an end of the facer output shaft 26. Each blade holder 60 has a latching assembly 63 operable to secure the disk 61 to an end of the facer output shaft 26.

Turning to FIGS. 3A-3B, each blade holder 60 is preferably a circular disk 61 with a center opening 62 complementing its respective penultimate noncircular portion 42 of the horizontal output shaft 26 of the drive unit 10. Each blade holder latching assembly 63 surrounds its center opening 62. The latching assembly 63 is operated to secure its blade holder 60 to the drive unit output shaft 26 after the center opening 62 of the blade holder 60 has been fully engaged on the penultimate noncircular portion 42 of the drive unit output shaft 26. Preferably, and as seen in FIGS. 3A-3B, the latching assembly 63 is a split wedge clamp ring adapted to grip the ultimate concentrically circular portion 43 of the drive unit output shaft 26 that will extend through the latching assembly 63 when the blade holder 60 is fully engaged on the penultimate noncircular portion 42 of the drive unit output shaft 26. As shown, the noncircular portions 42 of the drive unit output shaft 26 and the center openings 62 of the blade holder disk 61 are hexagonal.

Now looking at FIGS. 3C-3D, each blade holder 60 has at least one blade 64 mounted on an outside face of the disk 61. If, as seen in FIG. 3C, the shaving edge 65 of the blade 64 is at an angle 66 in which its distal end leads its travel, shaved ribbons S of polyolefin will be dispensed inside of the pipe P being shaved. If, as seen in FIG. 3D, the shaving edge 65 of the blade 64 is at an angle 67 in which its distal end trails its travel, shaved ribbons S of polyolefin will be dispensed outside of the pipe P being shaved.

As best seen in FIGS. 3C-3D, a blade 64 is mounted in a V shaped recess 68 in the outer face of the disk 61. The recess 68 has two sets 69 and 71 of at least two holes, as shown two sets of three holes, which are registrable with at least two holes in the blade 64. The alignment of the blade holes with one set 69 of recess holes orients the blade 64 at the angle 66, causing shaved ribbons S of polyolefin to be dispensed inside of the pipe P. The alignment of the blade holes with the other set 71 of recess holes orients the blade 64 at the angle 67, causing shaved ribbons S of polyolefin to be dispensed outside of the pipe P. As shown, the blade 64 is secured in the recess 68 using screws 72. Multiple blades 64 can be mounted on a disk 61, preferably at equal angular displacements on the disk 61, with each blade 64 in a separate recess 68.

The two blade holders 60 are mirror images to provide proper orientation of the blades and position in their V shaped recesses 68. Each blade holder 60 is mounted on its respective side of the facer F so that when rotating the blade edge 65 is leading and cutting and not trailing and dragging with the blade 64 on the trailing side of the V-shaped recess 68.

For normal operation, the blade 64 is oriented to disperse the shaved ribbons S inside the pipe P, as seen in FIG. 3C. They remain inside the pipe P during the entire facing operation. As a result, the ribbons S do not tangle in the facer F or the fusion machine and do not wrap tightly around the pipe P. Therefore, it is not necessary to periodically stop facing to clear the shaved ribbons S. Furthermore, ribbons S do not wrap around the pipe P, so the operator's view of the pipe periphery is not blocked. After facing, cleanup is easily accomplished by pulling a bundle of ribbons S from each pipe end.

For fusion of vertically oriented pipe P, the blade 64 is positioned as seen in FIG. 3D so ribbons S drop outside of the pipe P and down and do not tangle in the facer F. Also, for fusion of vertically oriented pipe P, the blade 64 on the lower blade holder 60 can be angled to disperse shaved ribbons S outside of its respective pipe P and the blade 64 on the upper blade holder can be angled to disperse shaved ribbons S inside of its respective pipe P.

Moving on to FIGS. 3E-3G, for the same drive unit 10, pairs of blade holders 60 of one diameter are interchangeable on the output shaft adapters 27 and 28 with pairs of blade holders 60 of another diameter. For example, blade holders 60 of large, intermediate and small outer diameter 73, 74 and 75, shown in FIGS. 3E, 3F and 3G, respectively, but all have the same size center openings 62 and latching assemblies 63. Furthermore, the lengths of the blades 64 can be sufficient to accommodate different diameter pipes P. Pipes P are typically of standardized sequential diameters. If, for example, the blades 64 are each sufficiently long to accommodate two sequential diameters of pipe P and the large, intermediate and small outer diameter 73, 74 and 75 blade holders 60 shown in FIGS. 3E, 3F and 3G, respectively, are available for use, the same drive unit 10 can be used to face six different diameters of pipe P.

As seen in FIGS. 3A-3G, the weight of a blade holder 60 can be reduced by voids 76 through the disk 61. However, if the shaved ribbons S are to be dispensed inside of the pipe P as by the blade holder 60 of FIG. 3C, it may necessary to close the voids 76 in some applications.

The Motor Assembly

Turning to FIG. 4, the motor assembly 80 has a motor 81 with a gearbox 82 driving an output shaft 83 with a coupler 84 on its free end. In the embodiment of FIG. 4, a mounting frame 85 attached to the motor assembly 80 by a bracket 86 has a mounting plug 87 adapted for engagement with the socket 22 on the elongated frame 11 of the drive unit 10, as shown in FIG. 2A. The coupler 84 on the motor assembly output shaft 83 and the input shaft coupler 31 of the drive unit 10 are spaced from the plug 87 and the socket 22 to align the couplers 84 and 31 on a common center axis 88. Thus, the couplers 84 and 31 are automatically mechanically engaged for rotation in unison when the motor assembly 80 is mounted on the drive unit 10 by telescoping the plug 87 into the socket 22. A detent pin 89 inserted into aligned apertures 91 secures the telescoped plug 87 and socket 22 with the couplers 84 and 31 engaged.

The plug and socket components 87 and 22 could be switched to the drive unit 10 and motor assembly 80, respectively. In either configuration, the socket 22 and plug 87 are adapted for tool-free engagement preventing horizontal and vertical displacement of the motor assembly 80 in relation to the drive unit 10. Preferably, the telescoping socket 22 and plug 87 are vertically aligned tubular members of square cross-section.

The gearbox 82 is preferably a multi-speed gearbox operable at a speed selected to correspond to a cross-section of a pipe P being faced. A two-speed gearbox 82 can be set to low speed for larger and/or thicker pipe P and set to high speed for smaller and/or thinner pipe P. The horsepower required is governed in part by the speed of the blade 64, which is a function of RPM and pipe diameter, and wall thickness of the pipe P. The maximum required horsepower and blade holder RPM are governed by the largest and thickest pipe P. If the same RPM is used for smaller and thinner pipe, the blade speed will be slower and will not draw the full available horsepower. Using the high-speed setting for smaller/thinner pipe P reduces facing time. Alternatively, the drive unit gearbox 32 may be adapted to provide the two-speed operation of the drive unit output shaft 26 using a single speed motor assembly 80.

A pair of handles 92, each spaced from the motor 81 and gearbox 82 on a corresponding wing 93 of the motor assembly 80, extend on axes 94 perpendicular to a diameter 95 of the motor 81 and gearbox 82 to facilitate lifting and manipulating the motor assembly 80 into position on the drive unit 10.

Assembly of the Facer

Figure 6:
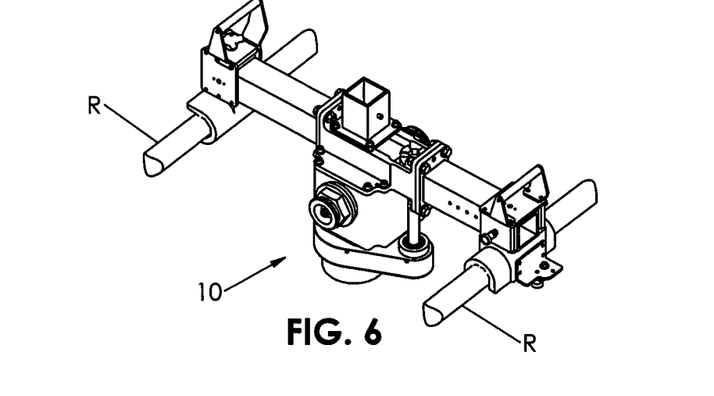
FIG. 6 is a perspective view of the drive unit seen in FIG. 5 after mounting on the guide rails of a fusion machine carriage.

Looking at FIGS. 5 and 6, in assembling the facer F for use, the drive unit 10 is first mounted on the carriage guide rails R. This is accomplished by lifting the drive unit 10 above and squared with the carriage guide rails R, tilting the drive unit 10 so that the horizontal guide rail bracket 12 points toward one guide rail R, sliding it onto that guide rail R until that guide rail R is fully seated in the horizontal guide rail bracket 12, rocking the drive unit 10 on that guide rail R toward the other guide rail R until the vertical guide rail bracket 13 is fully seated on the other guide rail R and then swinging the vertical guide rail bracket latch 19 to its closed condition.

Figure 7:
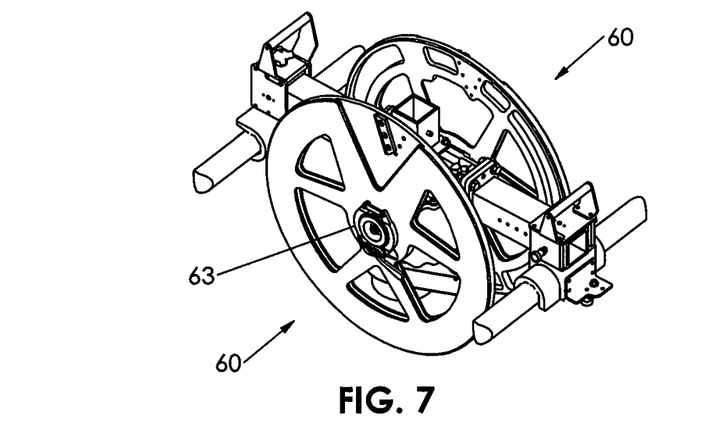
FIG. 7 is a perspective view of the blade holders seen in FIG. 5 after mounting on the drive unit which is on the guide rails as seen in FIG. 6.

Looking at FIGS. 5 and 7, with the blades 64 secured to their respective blade holders 60 at the desired angle for inside or outside dispersion of shaved ribbons S, the two blade holders 60 can each be lifted up and attached one at a time to the drive unit 10 by sliding them fully onto the hex nuts on the drive unit output shaft 26 and closing the latching assemblies 63 on the blade holders 60.

Figure 8:
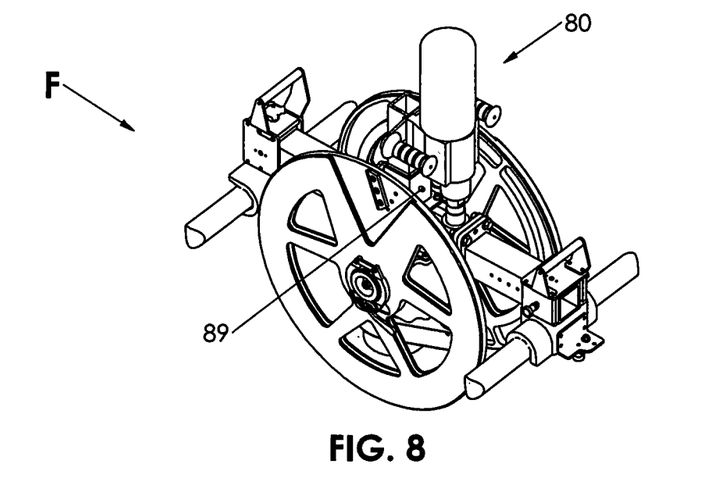
FIG. 8 is a perspective view of the motor assembly seen in FIG. 5 after mounting on the drive unit with the blade holders as seen in FIG. 7.

Looking at FIGS. 5 and 8, the motor assembly 80 is mounted on the drive unit 10 by raising the motor assembly 80 above the drive unit 10, aligning the plug 87 of the motor assembly 80 with the socket 22 of the drive unit 10 and lowering the motor assembly 80 to fully engage the plug 87 in the socket 22, thereby simultaneously engaging the coupler 84 of the motor assembly output shaft 83 with the coupler 31 of the drive unit input shaft 25 and aligning the apertures 91 in the plug 87 and the socket 22. The detent pin 89 can then be inserted into the aligned apertures 91, completing the assembly of the facer F. Disassembly of the facer F involves essentially a reversal of the steps of assembly.

The same facer F is seen in its assembled condition in FIG. 9A with large diameter blade holders 60, as seen in FIG. 3E, and in FIG. 9B with small diameter blade holders 60, as seen in FIG. 3G. The same drive unit 10 is used at its widest spacing of brackets in FIG. 9A and at its narrowest spacing of brackets in FIG. 9B. The same motor assembly 80 is used, but would be set at its lowest speed in FIG. 9A and at its highest speed in FIG. 9B. The facer F is seen in a horizontal orientation in FIGS. 9A and 9B and the blades 64 are angled for dispersing shaved ribbons S into the pipe P as seen in FIG. 3C. If the facer F were rotated 90° to a vertical orientation, the upper blade 64 would be angled for dispersing shaved ribbons S inside of the pipe P as seen in FIG. 3C and the lower blade 64 would be angled for dispersing shaved ribbons S outside of the pipe P as seen in FIG. 3D.

Thus, it is apparent that there has been provided, in accordance with the invention, a facer that fully satisfies the objects, aims and advantages set forth above. While the invention has been described in conjunction with specific embodiments thereof, it is evident that many alternatives, modifications and variations will be apparent to those skilled in the art and in light of the foregoing description. Accordingly, it is intended to embrace all such alternatives, modifications and variations as fall within the spirit of the appended claims.

What is claimed is:

1. For mounting on guide rails of a carriage of a machine used to fuse polyolefin pipe end-to-end, a facer comprising:
   a drive unit having guide rail brackets and an output shaft, wherein each of said guide rail brackets is adapted for tool-free engagement with a respective said guide rail to prevent horizontal and vertical displacement of said drive unit relative to the guide rails;
   two blade holders adapted for tool-free engagement on and rotation with said output shaft of said drive unit with said blade holders in parallel and on opposite sides of said drive unit;
   a motor assembly adapted for tool-free engagement with said drive unit to prevent horizontal and vertical displacement of said motor assembly in relation to said drive unit, said motor assembly having an output shaft; and
   a linkage engaging said output shafts of said drive unit and said motor assembly for transmission of power from said motor assembly output shaft to said drive unit output shaft.

2. A facer according to claim 1, said linkage comprising a mechanical coupling.

3. A facer according to claim 2, said linkage further comprising a gearbox.

4. For mounting on guide rails of a carriage of a machine used to fuse two polyolefin pipes end-to-end, a facer for shaving ribbons of polyolefin from a respective end of each respective polyolefin pipe, the facer comprising:
   a drive unit having a horizontal output shaft parallel to the guide rails with free ends of said horizontal output shaft being on opposite sides of said drive unit, each said free end of said horizontal output shaft having a penultimate portion of non-circular cross-section and an ultimate portion with a circular adapter concentric with said horizontal output shaft, said penultimate portions being identical and said ultimate portions being identical;
   two blade holders, each said blade holder having a center opening complementing said penultimate portion of a respective said free end of said horizontal output shaft; and
   two latching assemblies, each surrounding said center opening of a respective said blade holder, each of said latching assemblies being operable to secure its respective said blade holder to a respective one of said circular adapters with said center opening of said respective blade holder engaged on a respective said penultimate portion and with said two blade holders in parallel relationship.

5. A facer according to claim 4, wherein the cross-section of each said penultimate portion is hexagonal.

6. A facer according to claim 4, each said latching assembly being a split wedge clamp ring.

7. A facer according to claim 4 further comprising an array of pairs of blade holders of different diameters interchangeable with said two blade holders.

8. A facer according to claim 4, wherein said blade holders are respectively operable to shave the ribbons of polyolefin from the respective end of each respective polyolefin pipe, each said blade holder further comprising at least one blade mounted thereon at an angle causing ribbons of polyolefin shaved thereby to be dispensed inside of their respective pipe.

9. A facer according to claim 4, wherein said blade holders are respectively operable to shave the ribbons of polyolefin from the respective end of each respective polyolefin pipe, each said blade holder further comprising at least one blade mounted thereon at an angle causing ribbons of polyolefin shaved thereby to be dispensed outside of their respective pipe.

\* \* \* \* \*